United States Patent [19]

Hiramatsu et al.

[11] Patent Number: 4,662,488
[45] Date of Patent: May 5, 1987

[54] CONTROL SYSTEM FOR A CLUTCH INTERPOSED BETWEEN INPUT AND OUTPUT SHAFTS OF HYDRODYNAMIC POWER TRANSMITTING DEVICE

[75] Inventors: Takeo Hiramatsu, Nagaokakyo; Yoshimasa Nagayoshi, Kyoto, both of Japan

[73] Assignee: Mitsubishi Jidosha Kogyo Kabushiki Kaisha, Tokyo, Japan

[21] Appl. No.: 795,654

[22] Filed: Nov. 6, 1985

[30] Foreign Application Priority Data

Nov. 9, 1984 [JP] Japan .................................. 59-236346

[51] Int. Cl.⁴ ............................................. B60K 41/22
[52] U.S. Cl. ................................... 192/3.58; 192/3.31; 192/3.61; 74/866
[58] Field of Search ..................... 192/3.58, 3.57, 3.39, 192/3.68, 109 F, 103 R, 0.08, 3.62; 74/866, 731

[56] References Cited

U.S. PATENT DOCUMENTS

| | | | |
|---|---|---|---|
| 3,497,043 | 2/1970 | Leonard | 192/0.052 |
| 3,730,315 | 5/1973 | Annis et al. | 192/3.58 X |
| 3,752,284 | 8/1973 | Brittain et al. | 192/103 |
| 4,027,554 | 6/1977 | Ito et al. | 192/3.58 X |
| 4,428,467 | 1/1984 | Hiramatsu | 192/3.58 X |
| 4,466,311 | 8/1984 | Hiramatsu | 192/3.58 X |
| 4,468,988 | 9/1984 | Hiramatsu | 192/3.58 X |
| 4,476,970 | 10/1984 | Ito | 192/3.58 X |
| 4,488,625 | 12/1984 | Nobumoto et al. | 192/3.58 |
| 4,509,124 | 4/1985 | Suzuki et al. | 192/3.58 X |
| 4,531,433 | 7/1985 | Suga | 192/3.58 X |
| 4,535,652 | 8/1985 | Nishikawa et al. | 192/3.58 X |
| 4,582,182 | 4/1986 | Takeda et al. | 192/3.58 X |

FOREIGN PATENT DOCUMENTS 157831 9/1982 Japan .................................. 192/3.31

Primary Examiner—Leslie Braun
Assistant Examiner—Dwight G. Diehl
Attorney, Agent, or Firm—Robert E. Burns; Emmanuel J. Lobato; Bruce L. Adams

[57] ABSTRACT

An automatic transmission for a vehicle change-speed gear mechanism connected to an output shaft of a hydro-dynamic power transmitting device, and a clutch capable of connecting the input and output shafts of the hydro-dynamic power transmitting device, a drop in the torque of the output shaft of the transmission which occurs during an initial stage of a gear shaft, resulting shift shock, can be decreased by effectively utilizing the rotation inertia of an engine by temporarily increasing the engaging force of the clutch during the initial period.

12 Claims, 18 Drawing Figures

| FIG.2A | FIG.2B |

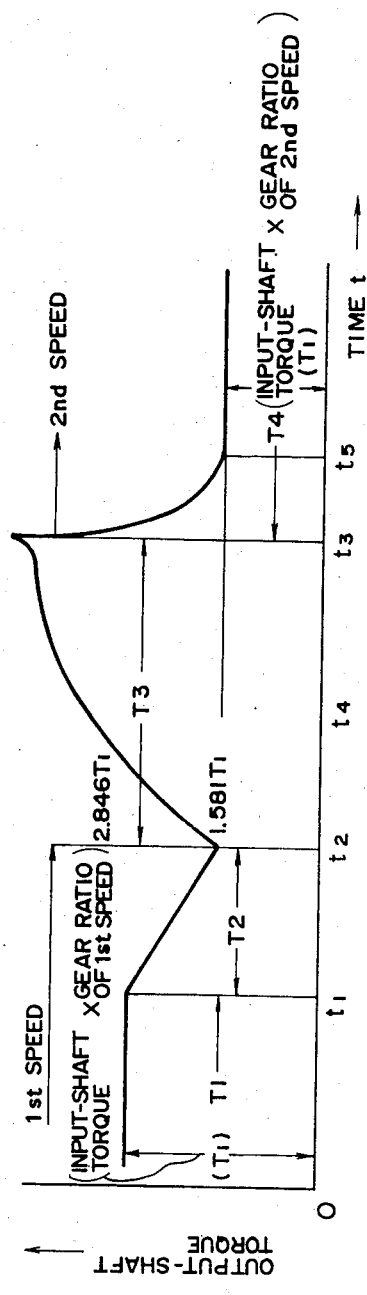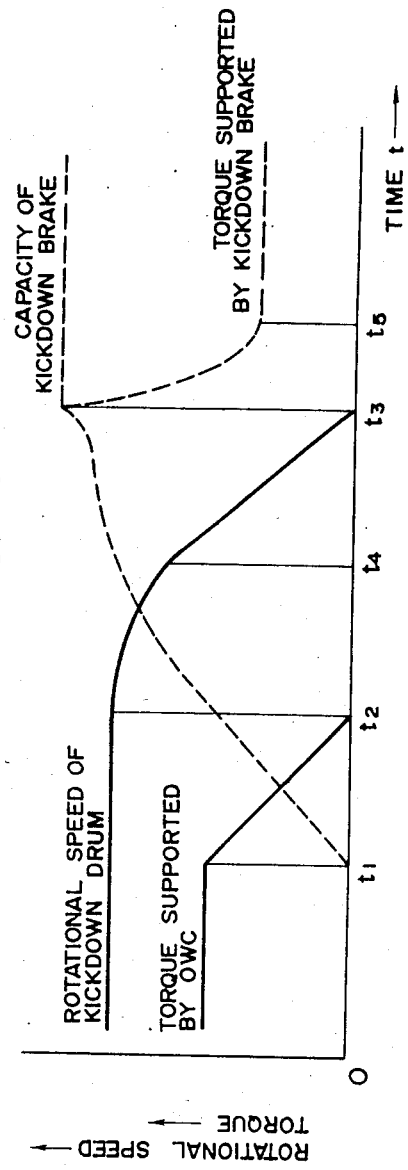

CONTROL SYSTEM FOR A CLUTCH INTERPOSED BETWEEN INPUT AND OUTPUT SHAFTS OF HYDRODYNAMIC POWER TRANSMITTING DEVICE

BACKGROUND OF THE INVENTION

1. Field of the Invention

This invention relates to an improvement in a control system for an automatic transmission for a vehicle.

2. Description of the Prior Art

In a conventional automatic transmission of a vehicle, which is coupled to a hydro-dynamic power transmitting device such as a torque converter or a fluid coupling, and designed to attain a plurality of gear ratios by selectively engaging a plurality of frictional engaging elements, a gear shift can be obtained by switching engagement from one of the frictional engaging elements to another.

With an automatic transmission of this kind, however, there is a moment when the output-shaft torque, as indicated by a dashed line in FIG. 6(a), of the transmission drops (indicated by reference character A), because of the structural feature thereof, during an initial stage of a gear shift. The drop in the output-shaft torque is particularly enlarged in the case of a shift between the first speed and the second speed whose gear ratios differ widely, resulting in a shift shock impairing the smoothness of the shift.

When upshifting from the first speed to the second speed, the torque ratio drops down to the level of the second speed while the transmission ratio is still remaining at the level of the first speed at point A in FIG. 6(a), as a consequence of which the output-shaft torque temporarily drops by the amount equal to the difference, between the gear ratio of the first speed and the gear ratio of the second speed, multiplied by the torque input to the input shaft of the transmission. Then, the output-shaft torque is increased again by the engaging torque of the frictional engaging elements that engage in the second speed and by an inertial force caused by acceleration and deceleration of each rotary element, and the speed ratio becomes that of the second speed when said acceleration and deceleration of each rotary element ends, thus completing the shift. As the inertial force of the rotary elements disappears, the output-shaft torque drops to the level of the second speed.

Referring now to FIGS. 9 to 17, the changes in the speed ratio and torque ratio involved in the aforementioned gear shift will be discussed in detail.

FIG. 11 is a speed diagram showing the relationship among the rotational speeds of a forward sun gear (F/S), an annulus gear (A/G), a carrier (C) and a reverse sun gear (R/S) which are the four rotary elements in a ravigneaux type planetary gear unit providing three forward speeds as shown in FIGS. 9 and 10.

In this speed diagram, the length corresponding to the reciprocal ratio of the radius of each rotary element with respect to the carrier (C) is shown along the axis of abscissa, each length being divided into portions shown on both sides of the carrier (C) according to the directions in which the rotary element turns when the carrier (C) is fixed. Along the axis of ordinate is indicated the speed of rotation of each rotary element. The relationship among the rotational speeds of the individual rotary elements is shown by a single straight line (such as a straight line AA indicating the first speed condition). Assuming that the inertial force of each rotary member is a mass, the torque exerted thereby is a force, and each of the straight lines (AA, BB and CC) in FIG. 11 is a lever, the dynamic characteristics of force working on each rotary element can be explained.

For example, a process to immobilize the reverse sun gear (R/S) by actuating a kickdown brake (KDB) when upshifting from the first speed to the second speed corresponds to a change from the straight line AA to the straight line BB, with a resulting change in the force acting on the annulus gear (A/G) which corresponds to a change in the output-shaft torque.

In FIG. 11, reference characters $Z_1$, $Z_2$ and $Z_4$ indicate the number of teeth of the forward sun gear (F/S), annulus gear (A/G) and reverse sun gear (R/S), respectively.

Using corresponding speed diagrams, changes in torque occurring in time spans T1 to T4 during the upshifting from the first speed to the second speed will be described in the following.

First, it is to be assumed that the input torque (or the amount of opening of the throttle valve of an engine that typically represents the input torque) and the vehicle speed remain constant during the upshift sequence.

FIG. 14 shows time span $T_1$ (ranging from time 0 to time $t_1$) in which the first speed is still maintained. This state may correspond to a lever carrying weights $W_1$ to $W_4$, which respectively correspond to the inertia of the forward sun gear (F/S), body, carrier (C) and reverse sun gear (R/S), that is pushed up at one end by input torque $T_1$ about a one-way clutch (OWC) that serves as a fulcrum. If the gear ratio of the first speed is 1:2.846, the weight (body) $W_2$ is pushed up by a force equal to $2.846T_1$ when input torque $T_1$ is given, as a consequence of which a downward force (torque) equal to $2.846T_1$ works on the lever. This force (torque) exerted on the lever is output-shaft torque $T_0$.

Next, in FIG. 15, time span $T_2$ (ranging from time $t_1$ to time $t_2$) is shown in which shifting from the first to the second speed takes place by operating the kickdown brake (KDB) to stop the rotation of the reverse sun gear (R/S). At this time, torque works in the direction to raise the reverse sun gear (R/S), the mass of which being $W_4$, in FIG. 15. As the engaging force $T_4$ of the kickdown brake (KDB) increases gradually to increase the force to push up the mass $W_4$, the force of the one-way clutch (OWC) to support the lever gradually decreases and eventually becomes zero. This change is accompanied by a shift of fulcrum from the one-way clutch (OWC) to the reverse sun gear (R/S). Also, the relationship between the input and the output forces (torques) changes from one for the first speed to that of the second speed. If the gear ratio of the second speed is 1:1.581, output torque $T_0$ decreases from $2.846T_1$ to $1.581T_1$.

It should be noted that when the force working on the one-way clutch (OWC) becomes zero or $T_4$ becomes equal to $0.581T_1$, the form of the speed diagram remains unchanged, which means that the speed ratio between the input and the output shafts remains the same as that for the first speed (2.846:1). However, the torque ratio between the two shafts has now changed to that of the second speed (1.581:1). For this reason, a temporary drop in the output-shaft torque, such as the one that is seen in time span $T_2$, occurs, which is unavoidable because of the structural characteristics of a multispeed transmission with gear train.

FIG. 16 shows time span $T_3$ (ranging from time $t_2$ to time $t_3$) in which the speed ratio has not changed to that of the second speed although the torque ratio is already that of the second speed. To attain the speed ratio of the second speed, the engaging torque $T_4$ of the kickdown brake (KDB) is increased further so that the reverse sun gear (R/S), the mass of which being $W_4$, is pushed up. Since the vehicle speed is assumed to be constant, the lever turns about the body whose mass is $W_2$, thereby raising each of the inertial masses mentioned before. Then, the resulting reaction force works on point $W_2$ of the lever as an inertial torque $\alpha$.

Therefore, the force (torque) working on the lever becomes $1.581T_1+\alpha$, resulting in an increase in the output-shaft torque.

It takes a certain amount of time before the second speed is achieved after the output torque began to increase. It is due to the time needed to increase or decrease the rotational inertia of each of the rotary elements. The length of the time is dependent on the length of $T_1$ and $T_4$. When the value of $T_4$ is larger, shifting time becomes shorter but shift shock increases.

FIG. 17 shows time span $T_4$ (time $t_3$ and onward) in which the rotation of the reverse sun gear (R/S) is stopped by the kickdown brake (KDB), the speed ratio becomes that of the second speed, and the inertial force $\alpha$ resulting from the motion of the inertial masses reduces to zero. Consequently, output torque $T_0$ decreases to $1.581T_1$ which is appropriate to the second speed.

As the inertial torque reduces, there is no more excessive slip in the torque converter, and the amount of slip returns to its normal level at which enough torque for the second speed can be transmitted.

SUMMARY OF THE INVENTION

The object of this invention is to provide a control system for an automatic transmission for vehicles that is designed to decrease a drop in the output torque of a transmission in the initial stage of a gear shift, which has been a problem with conventional automatic transmission, and thereby prevent or decrease the shift shock resulting therefrom.

This invention provides a control system for an automatic transmission for vehicles that permits attaining flat output torque by making up for a drop in the output torque of a transmission that occurs in the initial stage of gear shift by temporarily increasing the torque of the input shaft of a hydro-dynamic power transmitting device. The temporary increase of the input torque is achieved by temporarily increasing the engaging force of a clutch adapted to come in engagement with the input and output shafts of the hydro-dynamic power transmitting device, thereby causing the inertia of rotation of an engine that is rotating faster than the input shaft of the automatic transmission (or the output shaft of the hydro-dynamic power transmitting device) to be absorbed by the input shaft.

This invention also provides a control system for an automatic transmission for vehicles that reduces the shift shock by preventing an excessive increase in the output-shaft torque that might occur toward the end of speed change by gradually decreasing the engaging force of the clutch, increased in the initial stage, in the later stage of gear shift.

BRIEF DESCRIPTION OF THE DRAWINGS

FIGS. 12 and 13 are graphs explaining the action of the same mechanism.

DETAILED DESCRIPTION OF THE PREFERRED EMBODIMENTS

Figure 1:
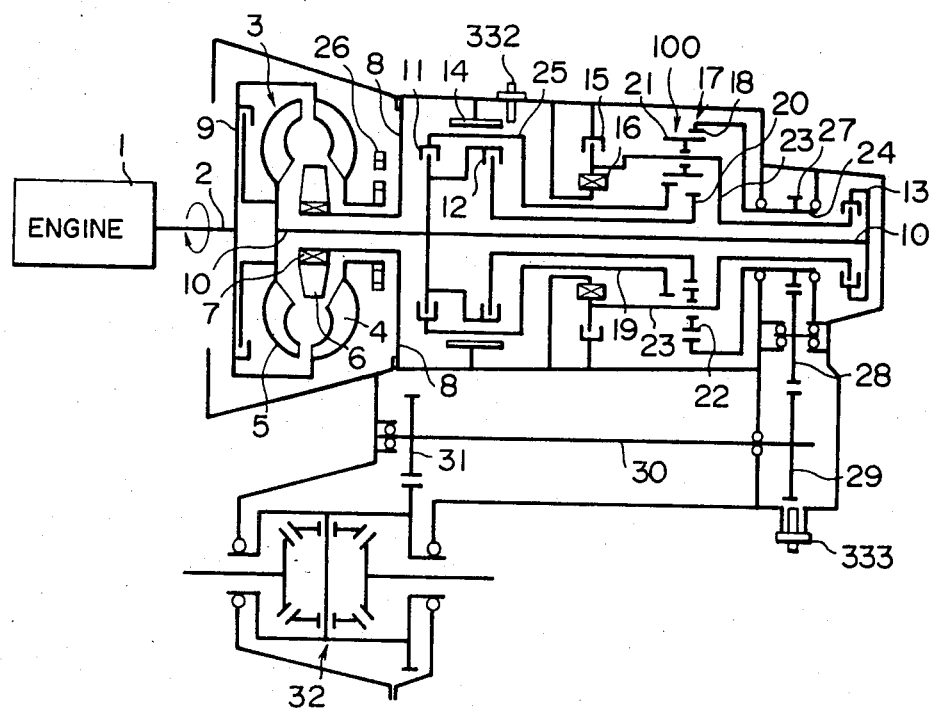
FIG. 1 is a schematic structural diagram showing an example of an automatic transmission to which this invention is applicable.

Now a preferred embodiment of this invention will be described in detail by reference to FIGS. 1 to 8.

The crankshaft of an engine 1, which is the power source of a vehicle, is connected to an input shaft 2 of a torque converter 3, and the input shaft 2 is linked to a pump 4 of the torque converter 3. The torque converter 3 comprises the pump 4, a turbine 5, a stator 6 and a one-way clutch 7. The stator 6 is connected to a housing 8 through the one-way clutch 7 which allows the stator 6 to rotate in the same direction as the input shaft 2, and not in the reverse direction.

A clutch 9 is provided between the input shaft 2 and the turbine 5 which is connected to the output shaft 10. The clutch 9 engages with a predetermined slip ratio when the vehicle is running in a higher-speed gear ratio at a constant speed, and functions to decrease the slip in the torque converter 3 in the high-speed gear ratio and thereby enhances torque transmission efficiency. The output of the engine 1 is transmitted to the turbine 5 through the clutch 9 and/or through the torque converter 3.

The control pattern of the clutch 9 under the steady vehicle running condition will not be described since it has been already fully discussed in U.S. Pat. Nos. 4,428,467 and 4,466,311.

The torque transmitted to the turbine 5 is further transmitted through an output shaft 10 of the torque converter 3 (which serves also as the input shaft of a change speed gear assembly) to the change speed gear assembly 100 which establishes four forward speeds and one reverse speed.

The change speed gear assembly 100 consists of three clutches 11, 12 and 13, a kickdown brake 14 and a low reverse brake 15, a one-way clutch 16, and a ravigneaux-type planetary gear set 17. The planetary gear set 17 comprises an annulus gear 18, a reverse sun gear 19, a forward sun gear 20, a long pinion 21, a short pinion 22 and a carrier 23. The annulus gear 18 is coupled to the output shaft 24 of the change speed gear assembly 100, and the reverse sun gear 19 is coupled to a kickdown drum 25. The kickdown drum 25 can be fastened to the housing 8 by means of the kickdown brake 14 and also can coupled to the output shaft 10 through the front clutch 11. The forward sun gear 20 can be coupled to the output shaft 10 through the rear clutch 12. The carrier 23, which rotatably couples the long pinion 21 and short pinion 22 together, can be connected to the kickdown brake 14, the low reverse brake 15 and the 4th-speed clutch 13 to actuate the hydraulic pistons thereof.

TABLE 1

| | | | | Select Pattern | | | | | | | | | | |
|---|---|---|---|---|---|---|---|---|---|---|---|---|---|---|
| | P | R | N | D₁ | | | | D₃ | | | 2 | | L | |
| Drive Ratio | — | R | — | 1st | 2nd | 3rd | 4th (O/D) | 1st | 2nd | 3rd | 1st | 2nd | 1st | 2nd |
| Friction Engaging Element | | | | | | | | | | | | | | |
| Clutch 11 | O | | | | | O | | | | O | | | | |
| Clutch 12 | | | | O | O | O | | O | O | O | O | O | O | O |
| Clutch 14 | | | | | O | | O | | O | | | O | | O |
| Brake 15 | | O | | | | | | | | | | | O | |
| One-way Clutch 16 | | | | ⊙ | | | | ⊙ | | | ⊙ | | | |
| Clutch 13 | | | | | | | O | | | | | | | |
| Gear Ratio | — | 2.176 | — | 2.846 | 1.581 | 1.000 | 0.685 | | | | | | | | housing 8 through the low reverse brake 15 and one-way clutch 16, both of which are functionally parallel, and also coupled to the output shaft 10 through the 4th-speed clutch 13 disposed at the rear end of the change speed gear assembly 100. The one-way clutch 16 is designed to prevent the reverse rotation of the carrier 23.

The power output from the transmission gear set 100 is transmitted to a transfer driven gear 29 through a transfer drive gear 27 fixed to the output shaft 24 and a transfer idle gear 28, then to a differential gear 32 through a transfer shaft 30, which is coupled to the driven gear 29, and a helical gear 31, and finally to the driving wheels not shown.

Figures 2, 2A:
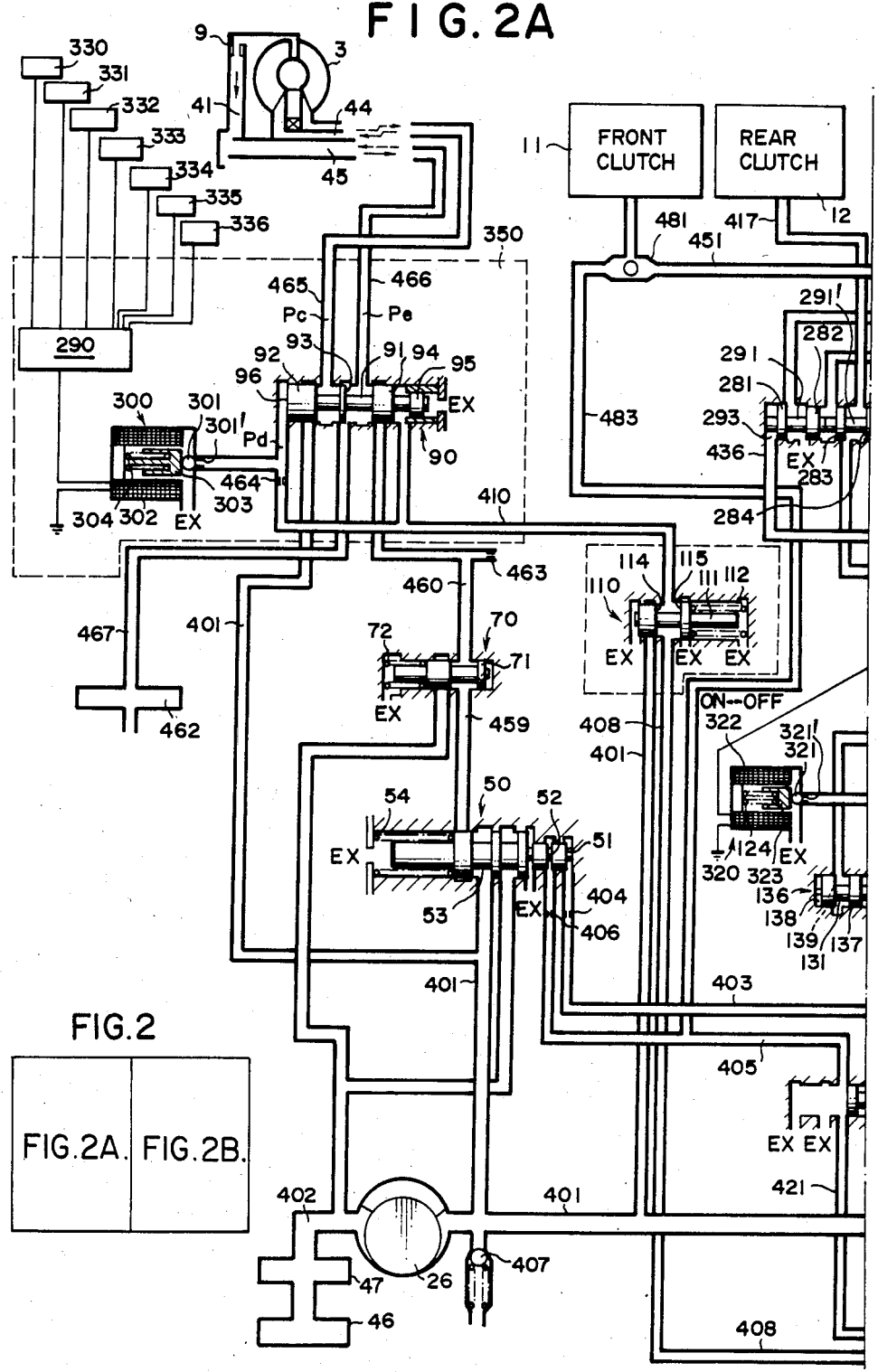
FIG. 2 is a hydraulic circuit showing an example of a control device that can be used with the same automatic transmission.
Figure 2B:
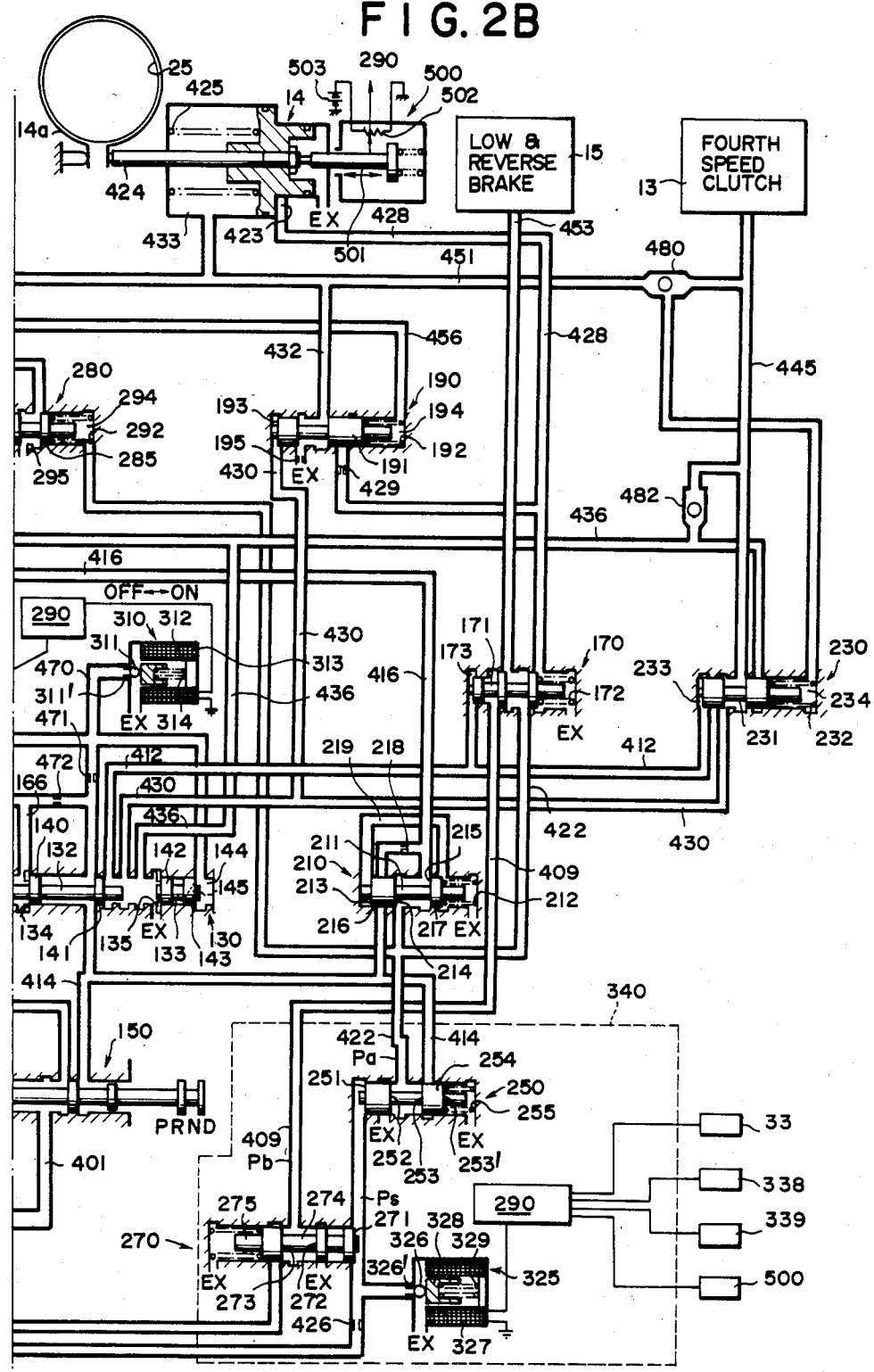
Figure 3:
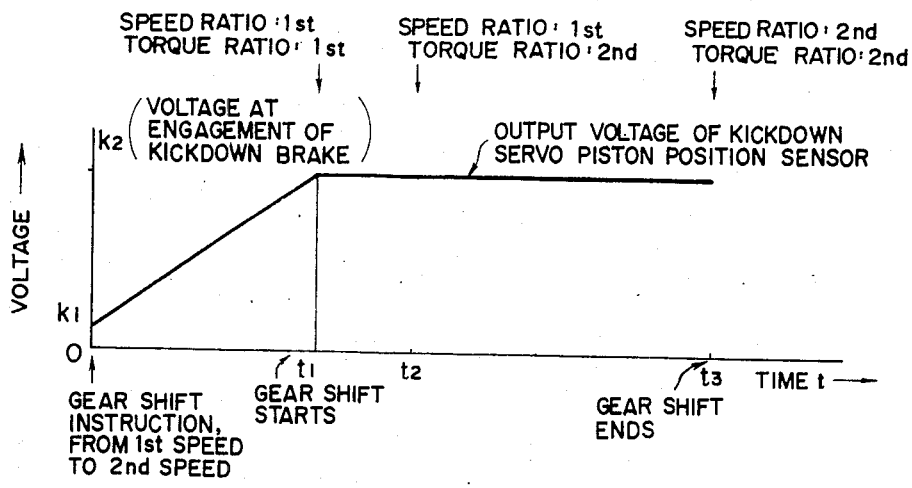
FIGS. 3 to 5, 6 (a) and (b) and 7 are graphs that explain the action of a preferred embodiment of this invention.

The clutches and brakes are friction engaging devices equipped with a hydraulically operated actuator which are operated by the hydraulic pressure generated by an oil pump 26 shown in FIG. 2. The hydraulic pressure is selectively supplied to the clutches 11 to 13 and brakes 14 and 15 by a hydraulic pressure control device to be described later according to the position of a selector lever of the known type (not shown) and an auxiliary switch to be described later and the running conditions of the vehicle that are detected by various running condition sensors (described later). Through various combinations of the clutches 11 to 13 and the brakes 14 and 15, four forward and one reverse speeds (gear ratios) can be achieved as shown in Table 1. As is obvious from Table 1, the select pattern is as follows: P (parking), R (reverse), N (neutral), D₄ (automatic gear shift among four forward speeds), D₃ (automatic gear shift among three forward speeds), 2 (automatic gear shift between two forward speeds), and L (fixed at 1st speed). The selector lever has six selecting positions of P, R, N, D, 2 and L. By switching the auxiliary switch, which is an overdrive switch 336, while setting the selector lever at position D (forward drive), D₃ or D₄ is selected.

In Table 1, a single circle shows the engaging condition of the clutches 11 to 13 and brakes 14 to 15 and a double circule shows that the carrier 23 is locked by the one-way clutch 16.

Now the hydraulic pressure control device that controls the clutch 9 of the torque converter 3 and the clutches 11 to 13 and brakes 14 and 15 of the automatic transmission will be described hereafter.

The hydraulic pressure control device selectively supplies, depending on the running condition of the vehicle, oil pumped by an oil pump 26 from an oil sump 46 through an oil filter 47 and an oil passage 402 to the hydraulic chambers of the torque converter 3, the clutch 9, the front clutch 11, the rear clutch 12, the kickdown brake 14, the low reverse brake 15 and the 4th-speed clutch 13 to actuate the hydraulic pistons thereof.

The hydraulic pressure control device essentially comprises a pressure-regulating valve 50, torque converter control valve 70, pressure-reducing valve 110, shift control valve 130, manually operated valve 150, 1st-2nd speed shift valve 170, 2nd-3rd and 4th-3rd speed shift valve 190, N-D control valve 210, 4th-speed clutch control valve 230, N-R control valve 270, rear clutch control valve 280, solenoid valve 300 and clutch control valve 90 constituting an engaging force adjusting device 350 for the clutch 9, solenoid valves 310 and 320, solenoid valve 325 and hydraulic pressure control valve 250 constituting an engaging force adjusting device 340 primarily for the clutch 11 and kickdown brake 14 which are connected to each other by oil passages.

The solenoid valves 300, 310, 320 and 325 are of the same structure, which are closed when deenergized, open and close the valve openings 301, 311, 321 and 326 depending upon electrical signals supplied from an electronic control device (a computer) 290. The solenoid valves 300, 310, 320 and 325 respectively comprise solenoids 302, 312, 322 and 327, valve bodies 303, 313, 323 and 328 to open and close the valve openings 301, 311, 321 and 326, and springs 304, 314, 324 and 329 to urge said valve bodies in the closing direction.

The electronic control device 290 controls the hydraulic pressure by varying the valve opening time through the control of the opening and closing of the solenoid valves 300 and 325 depending on the detected running condition of the vehicle and by varying the single-pulse current duration of the pulse current of several hertz to several tens of hertz, such as 50 Hz, supplied to the solenoid valves 300 and 325. The electronic control device 290 also controls the opening and closing combination of the solenoid valves 310 and 320. Input signals to the electronic control device 290 are supplied from an idle switch 330 that produces an ON signal on detecting that the throttle valve of the engine 1 is in the idling position, a rotational speed detector 331 detecting the rotational speed of the engine 1, a rotational speed detecting device 332 (pulse generator) to detect the rotational speed of the kickdown drum 25 shown in FIG. 1, a rotational speed detecting device 333 (pulse generator) on the transfer driven gear 29 to detect the rotational speed of the output shaft 24, and an accelerator switch 334 that produces an ON signal on detecting a non-operating condition (either not depressed or depressed only within the idling limit condition) of the accelerator pedal.

Also provided are a water temperature gauge unit 335 detecting the temperature of the cooling water in the engine 1, an overdrive switch 336 that turns on when D4 is selected, an inhibitor switch 33 serving as a selector lever position detector, a vehicle speed read switch 338 detecting the another running speed of the vehicle, a throttle valve opening sensor 339 to detect the amount of opening of the throttle valve, and a kickdown servo piston position sensor 500 that detects the time when a gear shift begins.

The kickdown servo piston position sensor 500 is designed to detect the amount of projection of the shaft 424 of the kickdown brake 14 in accordance with the degree to which the band 14a of the kickdown brake 14 comes into contact with the kickdown drum 25. The shaft 501 of the sensor 500, which is coupled to the shaft 424, changes the resistance value of a variable resistor 502 in accordance with the amount of projection. The partial voltage of a battery 503 at the variable resistor 502 is sent to the electronic control device 290.

The oil discharged from an oil pump 26 is supplied through an oil passage 401 to the pressure regulating valve 50, the clutch control valve 90, the manually operated valve 150 and the pressure reducing valve 110.

The pressure regulating valve 50 has a spool 53, which has pressure receiving surfaces 51 and 52, and a spring 54. When the manually operated valve 150 is set in position N or D by the selection made by the select lever, the pressurized fluid from an oil passage 401 passes through the manually operated valve 150, an oil passage 403 and an orifice 404 to act on the pressure receiving surface 51, whereby the hydraulic pressure in the oil passage 401 is kept constant at a predetermined level (such as 7 kg/cm$^2$; this pressure will be called the line pressure hereafter). When the manually operated valve 150 is in position R, the pressurized fluid from the oil passage 401 passes through the manually operated valve 150, an oil passage 405 and an orifice 406 to act on the pressure receiving surface 52, whereby the hydraulic pressure in the oil passage 401 is controlled to a constant level higher than said line pressure (such as 14.6 kg/cm$^2$) A relief valve 407 provided in the oil passage 401 serves as a bypass valve when a high-pressure fluid is discharged from the oil pump.

The oil led to the pressure reducing valve 110 through the oil passage 401 is thereby controlled to a constant pressure lower than said line pressure (such as about 2.4 kg/cm$^2$) and then led to oil passages 408 and 410. The pressure reducing valve 110, having a spool 111 and a spring 112, controls hydraulic pressure by balancing the hydraulic force resulting from the difference in area between opposite pressure receiving surfaces 114 and 115 of the spool 111 with the force exerted by the spring 112.

The regulated oil led to the oil passage 408 passes through an orifice 426 to the control side of the hydraulic pressure control valve 250, the control side of the N-R control valve and the opening 326 of the solenoid valve 325. The solenoid valve 325, which is controlled by the electronic control device 290, changes the regulated hydraulic pressure downstream of the orifice 426 in the oil passage 408, thereby developing an output pressure in an oil passage 422 or 409 conforming to the running condition of the vehicle at the time of a gear shift.

The N-D control valve, which serves as a switchover valve, has a spool 211 having a land 216 and a larger-diameter land 217 and a spring 212. The spool 211 is selectively switched between the left-end and right-end positions shown in FIG. 2 depending on the direction of the resultant hydraulic force acting on the pressure receiving surfaces 213 and 214 of the land 216 and the pressure receiving surface 215, which is the side closer to the land 216 of the land 217 and the urging force of the spring 212.

The hydraulic pressure control valve 250, having a spool 254, which possesses pressure receiving surfaces 251, 252, 253 and 253', and a spring 255, controls the hydraulic pressure in the oil passage 422 to a predetermined level Pa by balancing the hydraulic force acting on the pressure receivng surface 251 with the resultant hydraulic force resulting from the difference in area between the pressure receiving surfaces 252 and 253 and the urging force of the spring 255.

The N-R control valve 270, having a spool 274, which possesses pressure receiving surfaces 271, 272, and 273, and a spring 275, controls the hydraulic pressure in the oil passage 409 to a predetermined level Pb by balancing the hydraulic force working on the pressure receivng surface 271 with the hydraulic force resulting from the difference in area between the pressure receiving surfaces 272 and 273 and the urging force of the spring 275.

The hydraulic pressure control valve 250 and N-R control valve 270 function, in combination, as an accumulator to absorb the pulsation in the regulated pressure downstream of the orifice 426 in the oil passage 408 by the action of the hydraulic force from the pressure receiving surface 251 or 271 and the force exerted by the spring 255 or 275. The output hydraulic pressure led to the oil passage 422 principally controls the front clutch 11 and kickdown brake 14 that are employed in a forward drive, while the output hydraulic pressure led to the oil passage 409 controls the low reverse brake 15 that is employed in a reverse drive.

The solenoid valve 325, actuated by pulse signal of a frequency ranging from several hertz to several tens of hertz, such as 50 Hz, depending on the running condition of the vehicle, produced by the electronic control device 290 which detects the running condition, controls the time over which the valve opening 326 is opened and closed by means of duty control that is achieved by varying the pulse width of the pulse signal. The control pressure Ps, which acts on either the pressure receiving surface 251 of the hydraulic pressure control valve 250 or the pressure receiving surface 271 of the N-R control valve 270 and is regulated by the solenoid valve 325, is controlled between predetermined pressure limits by means of orifices 426 and 326'.

Accordingly, the hydraulic pressure control valve 250 controls the pressure of the hydraulic fluid supplied from an oil passage 414, which is a constant line pressure, between 0 kg/cm$^2$ and the line pressure by the control pressure Ps, and discharges the controlled pressure into the passage 422 as an output pressure Pa. Similarly, the N-R control valve 270 controls the pressure of the hydraulic fluid, supplied from the oil passage 421, which is higher than the line pressure, between 0 kg/cm$^2$ and said pressure of the hydraulic fluid, and discharges the controlled pressure into the passage 409 as an output pressure Pb.

The shift control valve 130 is controlled by combinations of the opening and closing of two ON-OFF controlled solenoid valves 310 and 320 and achieves four forward speeds. The shift control valve 130 has three spools 131, 132 and 133 and two stoppers 134 and 135. The spool 131 has two lands 136 and 137, a hydraulic chamber 138 on the outer side of the land 136, and an oil port 139 that connects said chamber 138 and the space between the lands 136 and 137. The spool 132 has two lands 140 and 141 of different diameters and pressing portions at both ends to come in contact with the spools 131 and 133. The spool 133 has two lands 142 and 143, a hydraulic chamber 144 on the outer side of the land 143, and an oil port 145 to connect said chamber 144 and the space between the lands 142 and 143. Between the spools 131 and 132, there is provided a stopper 134 that is fastened to the housing and provided with a hole through which the pressing portion at one end of the spool 132 passes. Between the spools 132 and 133, there is provided a stopper 135 that is fastened to the housing 8 and provided with a hole through which the pressing portion at the other end of the spool 132 passes. An oil passage 470 that at all times connects the space between the lands 140 and 141 of the spool 132 communicates with the oil passage 414 from the manually operated valve 150, an orifice 311' opened and closed by the solenoid valve 310 through an orifice 471, and the hydraulic chambers 138 and 144. The oil passage 470 communicates through an orifice 472 with the valve opening 321 that is opened and closed by the solenoid valve 320 and with the space between the spools 131 and 132 through an oil passage 166. The three spools 131, 132 and 133 are controlled so that first to fourth speed ratios are obtained by opening and closing of the two solenoid valves 310 and 320. The relationship between the opening and closing of the solenoid valves 310 and 320 and the individual transmission stages is as shown in Table 2. In Table 2, ON indicates the opened condition and OFF indicates the closed condition of the solenoid valves. The 1st-2nd speed shift valve 170 having a spool 171 and a spring 172 selectively switches the spool 171 between the left-end and right-end positions shown in FIG. 2 according to the pressing force exerted by the line pressure acting on the pressure receiving surface 173 at the left end of the spool 171 and the urging force of the spring 172.

TABLE 2

| Valve Speed Ratio | Solenoid Valve 310 | Solenoid Valve 320 |
| --- | --- | --- |
| First Speed | ON | ON |
| Second Speed | OFF | ON |
| Third Speed | OFF | OFF |
| Fourth Speed | ON | OFF |

Similarly, the 2nd-3rd and 4th-3rd speed shift valve 190 and the 4th-speed clutch control valve 230 respectively have spools 191 and 231 and springs 192 and 232. The two spools have hydraulic chambers 193 and 233 to which the line pressure is led through oil passages 430 and 412 on the left hand side thereof and hydraulic chambers 194 and 234 on the right hand side thereof. Each spool is selectively switched between the left-end and the right-end positions shown in FIG. 2.

The rear clutch control valve 280 has a spool 291 possessing two lands 281 and 282, a spool 291' having three lands 283, 284 and 285, and a spring 292. The spools 291 and 291' are selectively switched between the left-end and the right-end positions shown in FIG. 2 by balancing the force applied on the pressure receiving surface of the land 281 by the hydraulic pressure led to a hydraulic chamber 293 on the outer side (the left-hand side in FIG. 2) of the land 281, the force applied on the pressure receiving surface of the land 285 by the hydraulic pressure led to a hydraulic chamber 294 on the outer side (the right-hand side in FIG. 2) of the land 285 and the urging force of the spring 292.

Now the gear shift achieved through selective engagement of the individual friction engaging elements will be described in the following.

When the manually operated valve 150 is switched from N to D, the line pressure is led from the oil passage 401 to the oil passage 414. Then, the line pressure is led from the oil passage 414 to the hydraulic chamber of the rear clutch 12 through the N-D control valve 210, the rear clutch control valve 280 and the oil passage 417, thereby causing the rear clutch 12 to engage and the one-way clutch 16 to lock to achieve the first speed.

The relationship between changes in the output pressure Pa from the hydraulic pressure control valve 250 and the operation of the N-D control valve 210 will be described in more detail.

When the manually operated valve 150 is switched from N to D, the line pressure is supplied from the oil passage 414 to the N-D control valve 210 and the hydraulic pressure control valve 250. At the N-D control valve 210, the oil passage 414 is closed by the land 216. But at the hydraulic pressure control valve 250, the hydraulic pressure working on the pressure receiving surface 251 is decreased by the solenoid valve 251 that comes into action as the manually operated valve 150 is actuated, thereby shifting the spool 254 leftward from the right-end position. Then, the oil, whose pressure is reduced to the output pressure Pa by balancing the pressing force resulting from the difference in area between the pressure receiving surfaces 252 and 253, the force working on the pressure receiving surface 251 and the urging force of the spring 255, is led from the oil passage 422 to the N-D control valve 210. As a consequence, the oil having the reduced pressure is lead from the space between the two lands 216 and 217 to an oil passage 416, and then to the rear clutch 12 through the rear clutch control valve 280 to achieve initial engagement. When the output pressure Pa is gradually raised, the spool 211 gradually moves rightward on account of the difference in area between the pressure receiving surface 214 of the land 216 and the pressure receiving surface 215 of the land 217, until at last the oil passage 414 to which the line pressure is supplied communicates with the oil passage 416 through the orifice 218. Therefore, the line pressure is supplied to the rear clutch 12 to accomplish the full engagement thereof with a certain amount of lag after the switching of the manually operated valve 150.

After this, therefore, the oil passage 414 communicates directly with the oil passage 416, passing through the hydraulic pressure control valve 250, as long as the manufally operated valve 150 is kept in position D. The hydraulic chamber of the rear clutch 12 remains unaffected by the pressure reducing control effected by the hydraulic pressure control valve 250 and solenoid valve 325 at the time of a gear shift. As a consequence, troubles due to the shift, an unintended engine flare, and a slip of the rear clutch 12 and some other causes during the gear shift are prevented.

The low reverse brake 15 temporarily comes into engagement as a result of an increase in the output pressure Pa. But the low reverse brake 15 is soon released since in the first speed when the selector lever is in either position D or position 2 the output pressure Pa is reduced to 0 kg/cm$^2$ by opening the solenoid valve 325 immediately after first speed is achieved.

When the manually operated valve 150 is switched from N to D, the hydraulic pressure from the oil passage 414 is supplied also to the shift control valve 130. When the first speed is achieved with the valve openings 311 and 321 in the energized solenoid valves 310 and 320 opened, however, the hydraulic pressure downstream of the interposed orifices 471 and 472 become substantially equal to 0 kg/cm². Consequently, a high pressure builds up between the lands 140 and 141 of the spool 132, whereby the spool 132 is kept in the leftmost position in FIG. 2 by the leftward force resulting from the difference in area between the pressure receiving surfaces of the lands 141 and 142.

When the accelerator pedal is depressed to increase the vehicle speed from the first speed, the electronic control device 290 produces a signal for achieving second speed to the solenoid valves 310 and 320. Then power supply to the solenoid valve 310 is cut off while the solenoid valve 320 remains energized.

This switching causes the hydraulic oil in the oil passage 414 to pass through the orifice 471 to the space between the two lands 136 and 137 on the spool 131, oil port 139, hydraulic chambers 138 and 144, and the space between the two lands 142 and 143 on the spool 133. Then, the spool 131 moves rightward integrally with the spool 132 and stops on coming in contact with a stopper 134. The line pressure in the oil passage 414 is then led through the space between the two lands 140 and 141 on the spool 132 to an oil passage 412 to be supplied to the hydraulic chamber 173 of the 1st-2nd speed shift valve 170 to move the spool 171 to the right-end position in FIG. 2 and also to be supplied to the hydraulic chamber 233 of the 4th-speed clutch control valve 230 to move the spool 231 to the right-end position in FIG. 2. The 1st-2nd speed shift valve 170 supplies the hydraulic fluid led to the oil passage 422 further to a hydraulic chamber 423 on the engaging side of the kickdown brake 14, whereby the shaft 424 moves leftward against the force exerted by a spring 425 to engage a brake band 14a with the kickdown drum 25, thereby achieving the second speed.

In the course of the gear shift to the second speed, the hydraulic pressure control valve 250 is controlled by the action of the solenoid valve 325 and reduces the hydraulic pressure in the oil passage 422 (i.e., the oil passage 428) for a short period of time.

Next, when power supply to the solenoid valves 310 and 320 is cut off to achieve the third speed based on the shift command signal produced by the electronic control device 290, the line pressure is supplied to the space between the land 137 on the spool 131 and the land 140 on the spool 132 of the shift control valve 130, whereby the spool 132 is moved rightward in FIG. 2 by the line pressure working on the pressure receiving surface of the land 140 and stops when the pressing portion thereof comes in contact with the spool 133. Then the oil passage 414 communicates with the oil passage 430 to supply the line pressure to the hydraulic chamber 193 of the 2nd-3rd and 4th-3rd speed shift valve 190, thereby moving the spool 191 of the shift valve 190 to the right-end position. This switching of the shift valve 190 causes the oil passage 428 communicating with the valve 190 to communicate with an oil passage 432 through an orifice 429. The pressurized fluid supplied from the oil passage 428 to the oil passage 432 is further passed to the hydraulic chamber 234 at the right end of the 4th-speed clutch control valve 230 through an oil passage 451 and a changeover valve 480 and also to the hydraulic chamber of the front clutch 11 through the hydraulic chamber 433 on the releasing side of the kickdown brake 14 and a changeover valve 481.

The engagement and the disengagement of the kickdown brake 14 and front clutch 11 are carried out with an overlap, because the oil passage 432 connects the hydraulic chamber 433 on the releasing side of the kickdown brake 14 with the hydraulic chamber of the front clutch 11.

During this gear shift from the second speed to the third speed, as in the case of the gear shift from first speed to second speed, the hydraulic pressure control valve 250 functions to maintain the hydraulic pressure supplied to the oil passage 422 at a low level for a short period of time. But the rear clutch 12 is unaffected by this pressure reduction.

An orifice 429 interposed in the oil passage 428 maintains the hydraulic pressure in the hydraulic chamber 433 and the hydraulic chamber of the front clutch 11 both at the same low level while the hydraulic pressure control valve 250 is in action, thereby releasing the kickdown brake 14 and engaing the front clutch 11 at the same time. The third speed is established when the action of the hydraulic pressure control valve 250 stops, and the hydraulic pressure rises to the level of the line pressure, causing the front clutch 11 to engage completely. When the third speed is achieved, a synchronized rotating condition, in which the rotational speed of the output shaft 10 and kickdown drum 25 approaches and coincides with the rotational speed of the output shaft 24, is reached. The rotational speed detecting devices 332 and 333 detect this synchronized condition or the condition just before said condition as the moment indicating the establishment of the gear shift. When this detection is carried out, the action of the hydraulic pressure control valve 250 stops to raise the pressure of the hydraulic fluid supplied to the front clutch 11 to the level of the line pressure. As a result, the hydraulic pressure in the hydraulic chamber 234 at the right end of the 4th-speed clutch control valve 230 is also raised, whereby the spool 231 is switched to the left-end position in FIG. 2 and the line pressure in the oil passage 430 is supplied to the 4th-speed clutch 13 through an oil passage 445 to engage the 4th-speed clutch 13. The oil passage 445 communicates with the hydraulic chamber 234 through an oil passage 451, so as to maintain the spool 231 of the 4th-speed clutch control valve 230 in the left-end position in FIG. 2 until the hydraulic fluid in the oil passage 445 is discharged, preventing troubles such as the transmission becoming unable to shift and/or falling into neutral position as a result of the releasing or slipping of the 4th-speed clutch 13 in the course of the gear shift from the third speed to the fourth speed.

When the solenoid valve 310 is energized and the solenoid valve 320 is deenergized, with the overdrive switch 336 positioned at D₄, to achieve the fourth speed according to the signal from the electronic control device 290, the hydraulic pressure in the hydraulic chamber 144 of the shift control valve 130 drops to move the spool 133, along with the spool 132, to the rightmost position in FIG. 2. As a consequence, the line pressure in the oil passage 414 is led through an oil passage 436, the hydraulic chamber 293 of the rear clutch control valve 280 and a check valve 482 to the oil passage 445. The line pressure supplied to the hydraulic chamber 293 moves the spools 291 and 291' of the rear clutch control valve 280 to the right-end position in FIG. 2, whereby the oil passage 436 communicates with an oil passage 456 and the line pressure is supplied to the hydraulic chamber 194 of the 2nd-3rd and 4th-3rd speed shift valve 190 to move the spool 191 thereof to the left-end position in FIG. 2. At this time, the hydraulic fluid in the hydraulic chamber of the rear clutch 12 is immediately discharged to release the rear clutch 12. Also the hydraulic fluid in the hydraulic chamber of the front clutch 11 and the hydraulic chamber 433 of the kickdown brake 14 is discharged through a drain port 195 of the 2nd-3rd and 4th-3rd speed shift valve 190 to release the front clutch 11 and engage the kickdown brake 14. As in the case of the gear shift from the first speed to the second speed and from the second speed to the third speed, the hydraulic pressure control device 250 functions to lower the pressure of the hydraulic fluid in the oil passage 422 for a short period of time in the course of the gear shift, thereby lowering the engaging hydraulic pressure supplied to the hydraulic chamber 423 of the kickdown brake 14 to achieve smooth engagement. When the engaging hydraulic pressure becomes the level of the line pressure, engagement is completed achieving the fourth speed.

Next, the downshift operation will be described, in which the hydraulic units are switched in the order opposite to that of the upshift operation described above. When the two solenoid valves 310 and 320 are deenergized to shift from the fourth speed to the third speed on the basis of the signal from the electronic control device 290, the line pressure in the oil passage 436 is discharged to shift the spool 291 of the rear clutch control valve 280 to the left-end position. At the same time, the spool 191 of the 2nd-3rd and 4th-3rd speed shift valve 190 moves to the right-end position, thereby supplying the hydraulic fluid to the oil passages 417 and 432.

Then, the hydraulic fluid is smoothly supplied to the hydraulic chamber 433 of the kickdown brake 14 and the hydraulic chamber of the front clutch 11 through the orifice 429.

Thus, the kickdown brake 14 is immediately released during this down shift process, and the hydraulic pressure control valve 250 functions for a short period of time to maintain the hydraulic fluid in the oil passage 422 at a low level.

When downward shifting from the third speed to the second speed, the solenoid valve 310 is deenergized while the solenoid valve 320 is energized. The hydraulic pressure between the spools 131 and 132 of the shift control valve 130 drops to cause the spool 132 to move one step to the left in FIG. 2, thereby discharging the hydraulic fluid in the oil passage 430. Consequently, the spool 191 of the 2nd-3rd and 4th-3rd speed shift valve 190 moves to the left-end position to discharge the hydraulic fluid in the oil passage 432. At the same time, the spool 231 of the 4th-speed clutch control valve 230 moves to the right-end position to discharge the hydraulic fluid in the oil passage 445 through the oil passage 436 and the shift control valve 130. The 4th-speed clutch 13 is immediately disengaged, and the release of the front clutch 11 and the engagement of the kickdown brake 14 are gradually effected, as in the case of the gear shift from the fourth speed to the third speed, by the action of the hydraulic pressure control valve 250 during the gear shift, whereby the second speed is smoothly achieved.

In downward shifting from the second speed to the first speed, both solenoid valves 310 and 320 are energized. The spools 131 and 132 of the shift control valve 130 move to the leftmost position to discharge the hydraulic fluid in the oil passage 412. And the spool 171 of the 1st-2nd speed shift valve 170 and the spool 231 of the 4th-speed clutch control valve 230 move to the left-end position. As a consequence, the hydraulic fluid in the kickdown brake 14 is discharged, whereby the kickdown brake 14 is released and the first speed is established.

When position $D_3$ or 2 is selected by means of the selector lever or the overdrive switch, switching of oil passages by the manually operated valve 150 is not performed. Instead, signals are supplied to the electronic control device 290 from the inhibitor switch 33 of the selector lever and the overdrive switch 336 to control the solenoid valves 310 and 320 so that no gear shift beyond the fourth or third speed is carried out.

When the manually operated valve 150 is selected at position L while the vehicle is running at a speed above a predetermined level, such as 50 km/h, the second speed is maintained. As the vehicle speed decreases below that predetermined level, the fixed first speed is obtained by the control of the solenoid valves 310 and 320. In this case, the solenoid valve 225 is fully closed after the hydraulic control during the gear shift has been completed, whereby the line pressure is supplied to the low reverse brake 15 to achieve the engagement thereof.

As in the other modes of a gear shift described before, the hydraulic pressure control valve 250 functions to maintain the hydraulic pressure at a low level to ensure a shockless gear shift.

The following paragraphs describe the reversing operation.

When the manually operated valve 150 is selected in position R, the oil passage 401 communicates with the oil passages 405 and 421, and leads the pressurized fluid in the passage 421 to the low reverse brake 15 through the N-R control valve 270, oil passage 409, 1st-2nd speed shift valve 170 and oil passage 453. Meanwhile, the pressurized fluid supplied to the oil passage 405 passes through an oil passage 483 and the changeover valve 482 to the hydraulic chamber of the front clutch 11, whereby the clutch 11 and the brake 15 engage to achieve the reverse drive. During this reversing operation, too, the N-R control valve 270 functions as a hydraulic pressure regulating valve, and the spool 254 and spring 255 of the hydraulic pressure control valve 250, in combination, function as a pulsation alleviating accumulator and change the output pressure Pb from the oil passage 409.

The hydraulic fluid led from the pressure regulating valve 50 to the torque converter control valve 70 through an oil passage 459 is controlled to about 2.5 kg/cm² by balancing the controlling hydraulic pressure acting on the pressure-receiving surface at the right end of the spool 71 shown in FIG. 2 with the urging force of the spring 72, and then passes through an oil passage 460 to the clutch control valve 90. The hydraulic fluid in the oil passage 460 is supplied through an orifice 463 to the lubricating system of the transmission gear set 100.

The clutch control valve 90 has, as shown in FiG. 2, a spool 91 which possesses lands 92, 93 and 94 and a land 95 smaller in diameter. The pressure-receiving surface 96 of the land 92 is adapted to receive the hydraulic fluid whose pressure has been reduced to a predetermined level by the pressure reducing valve 110. Said hydraulic pressure supplied through an orifice 464 is regulated by the solenoid valve 300 and becomes a control pressure Pd.

When the control pressure Pd is reduced by the control of the solenoid valve 300, the spool 91 moves leftward to cause the oil passage 401 to communicate with an oil passage 465, whereby the line pressure is supplied to the torque converter 3 through the oil passage 465 and an oil passage 44 to engage the clutch 9. At the same time, oil passages 41, 45 and 466 communicate with an oil passage 467, whereby the operating hydraulic fluid in the clutch 9 is discharged into an oil cooler 462. At this time, the hydraulic fluid from the torque converter control valve 70 is not supplied to the torque converter 3 since the oil passage 460 is closed by the land 90.

If the control pressure Pd is not reduced by the solenoid valve 300, the spool 91 moves rightward to cause the oil passage 460 to communicate with an oil passage 466, whereby the reduced control pressure is supplied from the torque converter control valve 70 to the clutch 9 for disengagement. At the same time, the oil passage 465 communicates with the oil passage 467 to discharge the hydraulic fluid in the torque converter 3 into the oil cooler 462. At this time, the line pressure supplied through the oil passage 401 is cut off by the land 92 and, therefore, not supplied to the torque converter 3.

By the action of the solenoid valve 300, the control pressure Pd can be adjusted to the desired level between the pressure decreased at the pressure regulating valve 110 and 0 kg/cm² resulting from the release of the solenoid valve. Accordingly, the condition of the clutch control valve 90 and, therefore, the amount of the slip of the clutch 9 can be finely adjusted.

Figure 8:
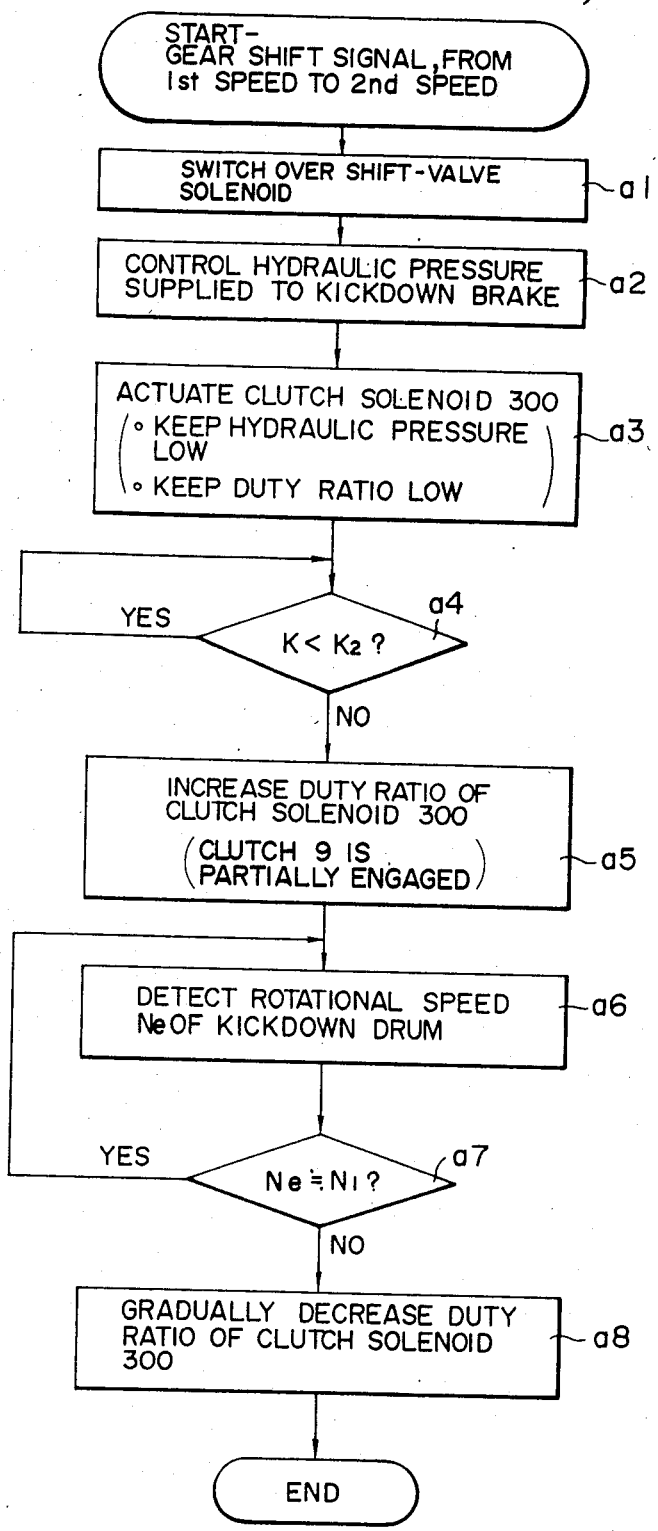
FIG. 8 is a flow chart showing the controlling process of a preferred embodiment of this invention.
Figure 9:
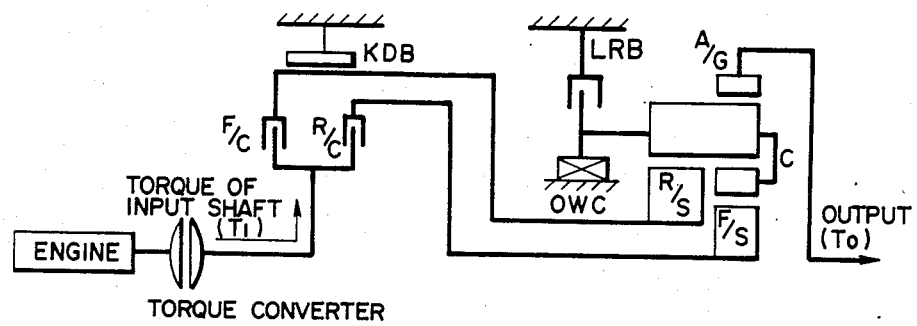
FIGS. 9 and 10 are schematic illustrations of a transmission gear mechanism used with common automatic transmission.
Figure 10:
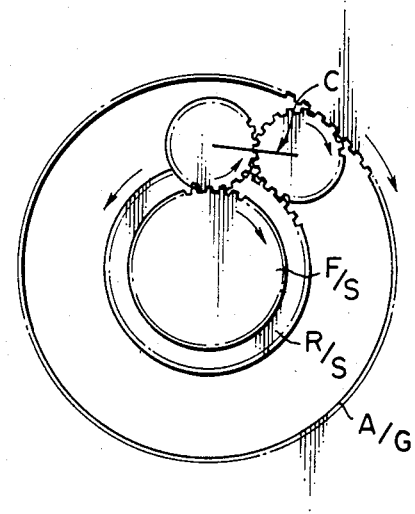
Figure 11:
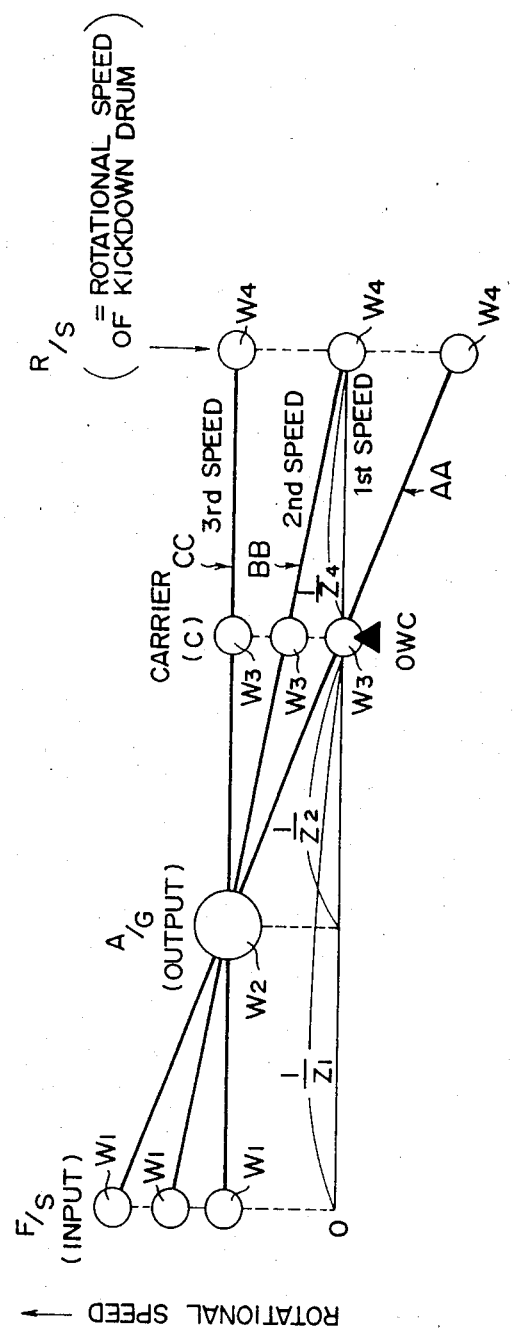
FIG. 11 is a speed diagram of the same mechanism.
Figure 14:
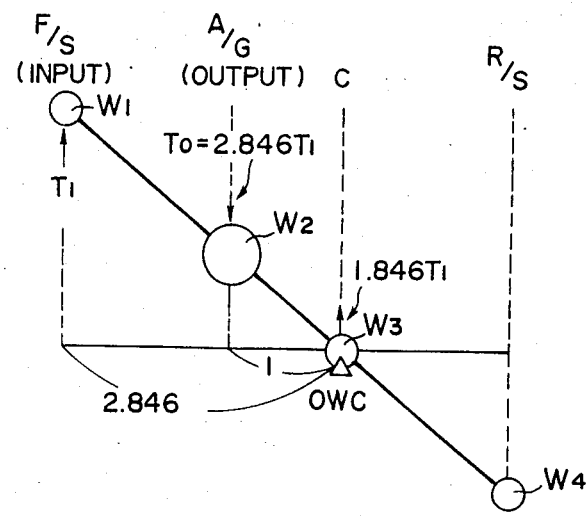
FIGS. 14 to 17 are speed diagrams explaining, step by step, the upshifting from first speed to second speed achieved by the same automatic transmission.
Figure 15:
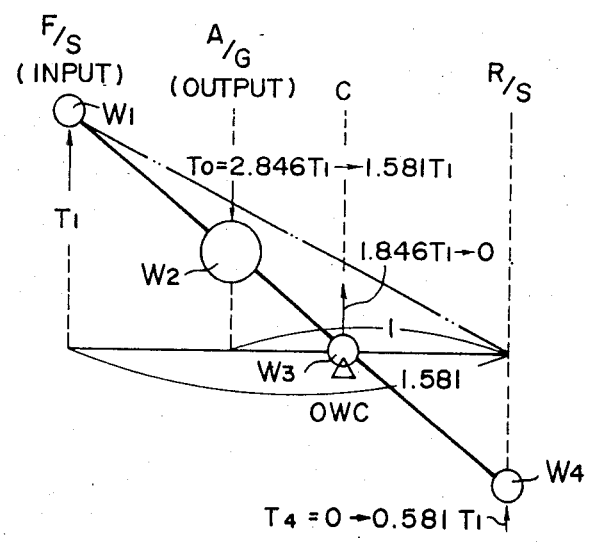
Figure 16:
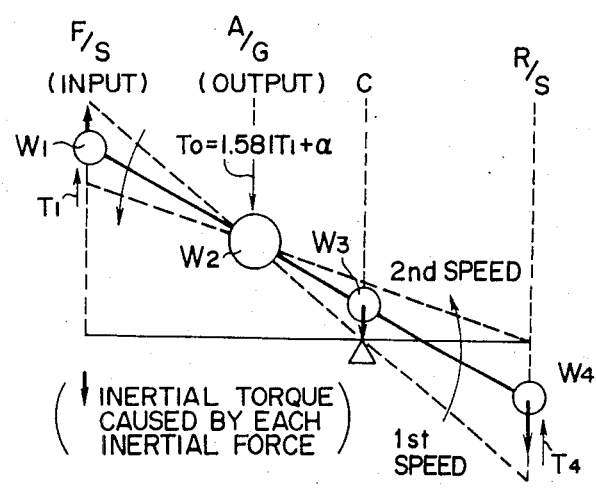
Figure 17:
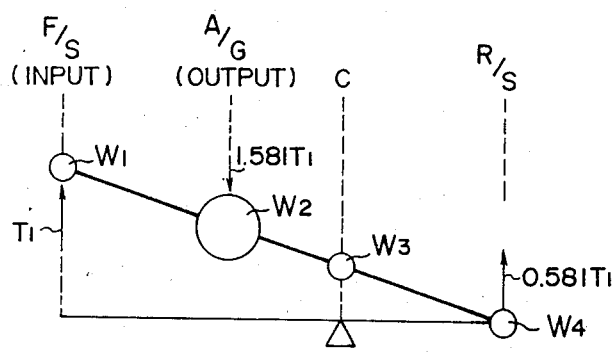

Referring now to a flow chart shown in FIG. 8, the control mode of the clutch 9 of the above-described transmission control system in the case of an upshift from first speed to second speed will be described.

When a signal for the gear shift to the second speed is produced by the electronic control device 290, signals to switch over the solenoid valves 310 and 320 are produced (step a1). Then the electronic control device 290 controls the solenoid valve 325, whereby the hydraulic pressure supplied to the kickdown brake 14 or the engaging force of the kickdown brake 14 is regulated so as to follow the desired characteristic during the gear shift (step a2). At the same time, a control signal having a small duty ratio is supplied to the solenoid valve 300 that constitutes the engaging force adjusting device 350 of the clutch 9 to keep the hydraulic pressure Pe supplied to the clutch 9 at a low level, thereby bringing the clutch 9 into a standby condition that is a state just before the engagement (step a3).

That is, when the signal to shift from the first speed to the second speed is produced, the hydraulic fluid is simultaneously supplied to the kickdown brake 14 and the clutch 9. Actually, however, the hydraulic pressure supplied to the kickdown brake 14 does not increase until the piston therein moves to engage the brake band 14a with the kickdown drum 25 or, in other words, until the piston of the kickdown brake 14 completes the stroke thereof. Therefore, the hydraulic pressure supplied to the clutch 9 must be kept at a low level (see time span $T_1$ (=0 to $t_1$) in FIG. 4).

Next, judgement is made if the output voltage k from the kickdown servo piston position sensor 500 has reached the voltage $k_2$ that is a predetermined value detected at the time when the brake band engages (see FIG. 3) (step a4).

When it has been confirmed that $k=k_2$, a first control signal with a large duty ratio is supplied to the solenoid valve 300 to increase the hydraulic pressure Pe that is supplied to the clutch 9, thereby increasing the engaging force of the clutch 9. Then, the clutch 9 is brought into a partially engaged condition or a condition immediately before the complete engagement in which a certain amount of slip can occur (step a5). At this time, the duty ratio is controlled so that the hydraulic pressure supplied to the clutch is regulated to the predetermined value, depending on the degree of the opening of the throttle valve of the engine 1 and the vehicle speed.

Figure 4:
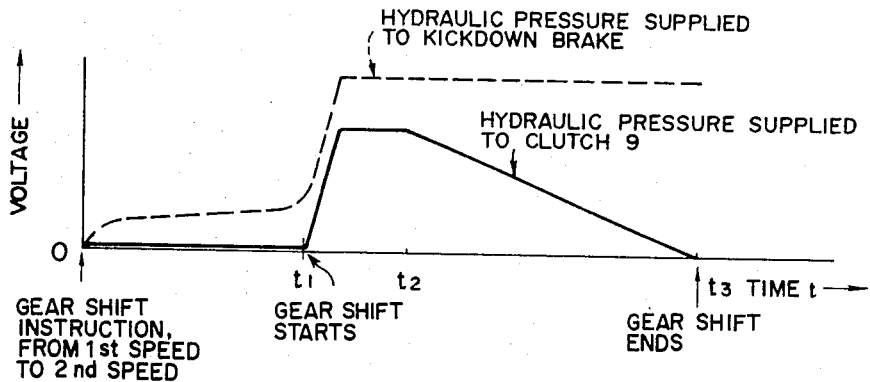
Figure 5:
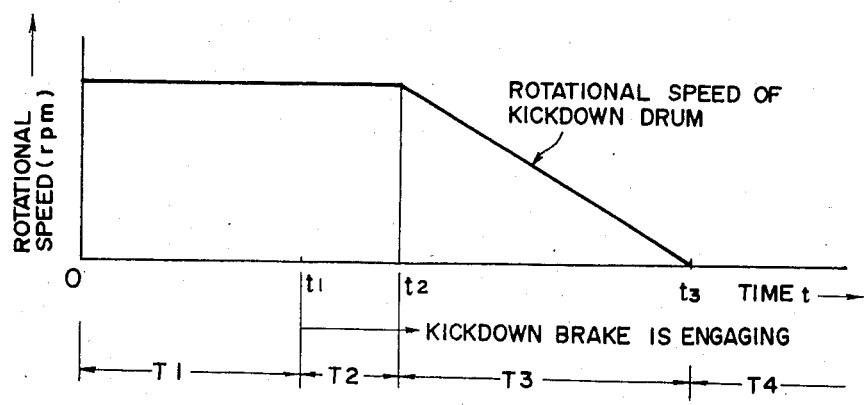

In the above state, or when the kickdown servo piston position sensor 500 has detected the engagement of the brake band 14a with the kickdown drum 25, the hydraulic pressure supplied to the kickdown brake 14 increases as shown in FIG. 4. Therefore, the hydraulic pressure supplied to the clutch 9 must be increased to the predetermined value to bring the clutch 9 into the partially engaged condition mentioned before. During the gear shift from the first speed to the second speed under normal running conditions, the engine 1 or the input shaft 2 of the torque converter 3 rotates faster than the output shaft 10 thereof, so that the inertial force generated by the rotation of the engine 1 is transmitted to the speed change gear assembly through the output shaft 10 by the action of the partially engaged clutch 9. The resulting increase in the input torque to the speed change gear assembly in the initial stage of the gear shift compensates for the drop in the output torque from the transmission, thereby decreasing the fluctuation in the output torque in that stage.

Figure 7:
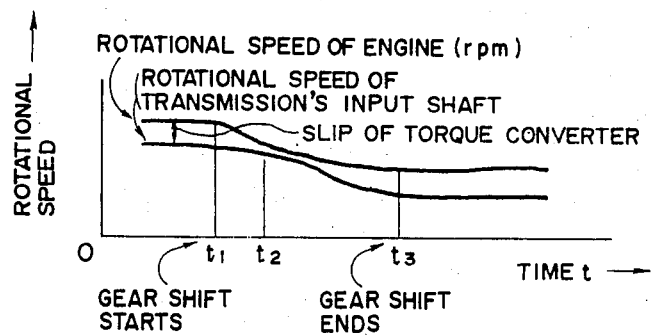

Since the inertial force of the rotation of the engine 1 is absorbed by the transmission in the initial stage of the gear shift as described above, the rotational speed of the engine 1 begins to decrease as shown in FIG. 7. As a consequence, part of the inertial force of the rotation of the engine 1, which must be absorbed by the engagement of the kickdown brake 14, is absorbed in said stage, thereby limiting to a cetain extent an increase in the output torque caused by the absorption of the inertial force in the later stage of the gear shift.

Therefore, the fluctuation in the output torque is decreased and a smooth gear shift is attained.

After the execution of the above control, the rotational speed Ne of the kickdown drum 25 is detected (step a6). Then, judgement is made if the rotational speed Ne has deviated from the rotational speed $N_1$ of the kickdown drum 25 in first speed (step a7). That is, by detecting a decrease in the rotational speed of the kickdown drum 25 attained by increasing the engaging force of the brake band 14a, it is detected that the supporting element of the transmitted torque is now switched from the one-way clutch 16 to the kickdown brake 14.

When it is confirmed that $Ne \neq N_1$, a second control signal whose duty ratio gradually decreases is supplied to gradually decrease the engaging force of the clutch 9 in accordance with the decrease in the rotational speed of the kickdown drum 25 (step a8). By this means, the hydraulic pressure supplied to the clutch 9 is lowered to 0 kg/cm² or a level at which the clutch 9 is allowed to cause a given amount of slip from the time when the supporting element of the transmitted torque switches from the one-way clutch 16 to the kickdown drum 25 to the time when the gear shift is completed (shown in FIG. 4). This control is aimed at the reduction of the shift shock. If the clutch 9 were tightly engaged until the gear shift is completed, the speed change gear assembly 100 would absorb a greater amount of inertial force of the engine 1 due to the smaller amount of the slip of the torque converter 3, causing the output torque in the later stage of the gear shift to increase and producing a greater shift shock.

At time $t_3$ and afterward (=time span $T_4$), the rotation of the kickdown drum 25 is stopped and the second speed is achieved.

Figure 6A:
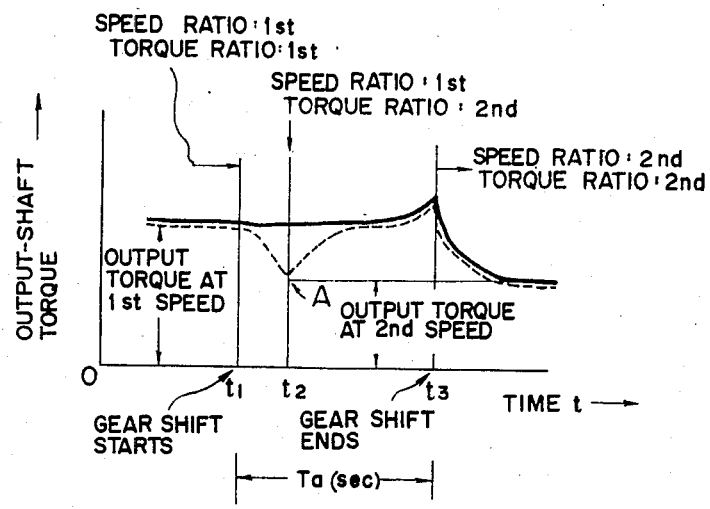
Figure 6B:
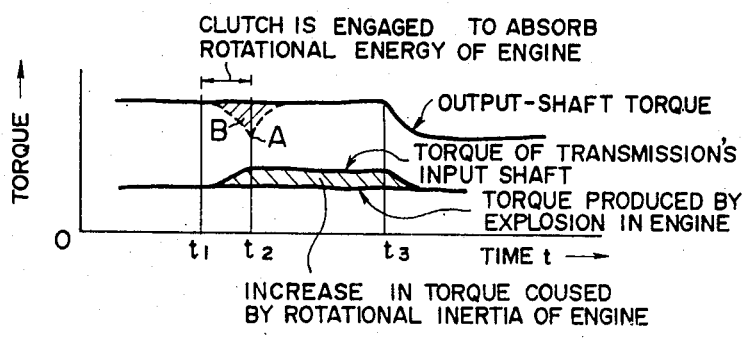

As a result of the above control, the output torque of the transmission in a short period of time ($t_a$) between time $t_1$ when the gear shift starts and time $t_3$ when the gear shift ends becomes as indicated by the solid line in FIGS. 6 (a) and (b). A drop in the output torque in the initial stage of the gear shift and an excessive increase in the output torque in the later stage are either prevented or reduced, with a resulting decrease in the shift shock.

After completion of the above gear shift, the clutch 9 engages with a desired slip ratio as mentioned previously, thereby reducing the amount of the slip of the torque converter 3 and enhancing the efficiency of transmission.

In the above preferred embodiment, this invention is applied to the gear shift from first speed to second speed in which the drop in the output torque in the initial stage of the gear shift is relatively large. This invention is by no means limited thereto, but is also applicable to the gear shift from second speed to third speed and from third speed to fourth speed.

In the above preferred embodiment, the start of the gear shift is detected by detecting the moment when the engagement of the kickdown brake 14 starts by use of the kickdown servo piston position sensor 500 that detects the position of the piston of the kickdown brake 14. However, the position of the piston is difficult to detect when the object of detection is a clutch. Therefore, a hydraulic pressure detecting device, a pressure switch that opens or closes at a predetermined pressure level, or other similar device may be provided at the oil passage through which hydraulic fluid is supplied to such a clutch. With this provision, the start of the gear shift is detected by detecting the moment when the hydraulic pressure supplied to the clutch has reached a level that is enough to start the engagement of the clutch on the basis of a signal supplied from said hydraulic pressure detecting device, pressure switch or the like.

In the above preferred embodiment, a potentiometer of the known type is used as a device to detect the point at which the engagement of the kickdown brake 14 begins. A switch to detect the start of the engagement of the kickdown brake disclosed in FIGS. 6 (a) and (b) of U.S. patent application Ser. No. 530,642, filed by the inventor, may be used instead.

In addition to the hydraulically operated clutch used in the above preferred embodiment, similarly, an electromagnetic clutch or other types of clutch that is capable of adjusting the engaging force (torque capacity) may be used for coupling the input and output shafts of the hydrodynamic power transmitting device.

What is claimed is:

1. In a control system for a clutch interposed between input and output shafts of a hydrodynamic power transmitting device coupled to a prime mover, an engaging force adjustable clutch interposed between input and output shafts of the hydrodynamic power transmitting device so as to function in parallel with said hydrodynamic power transmitting device, a speed change gear assembly coupled to the output shaft of the hydrodynamic power transmitting device and adapted to obtain a plurality of speed ratios by selectively engaging a plurality of engaging elements, shift control means for attaining a speed ratio appropriate for the running condition of the vehicle by selectively actuating the engaging elements, and engaging force adjusting means for adjusting the engaging force of the clutch, the improvement comprising control means for supplying a control signal to said engaging force adjusting means to increase the engaging force of the clutch in the initial stage of a shift of the speed change gear assembly.

2. A control system as claimed in claim 1, including means for detecting a moment when the shift of said speed change gear assembly starts, said control means having means for producing said control signal when the shift start time detecting means detects the start of the shift.

3. A control system as claimed in claim 2, further including an engaging element adapted to engage to attain a shift, wherein said shift starting time detecting means includes means for detecting a moment when said engaging element starts to engage.

4. A control system as claimed in claim 3, wherein said engaging element comprises a friction engaging device having a hydraulically operated actuator, said detecting means comprising a position detecting device to detect the position of a piston in said actuator.

5. In a control system for a clutch interposed between input and output shifts of hydrodynamic power transmitting device coupled to a prime mover, an engaging force adjustable clutch interposed between input and output shafts of the hydrodynamic power transmitting device so as to function in parallel with said hydrodynamic power transmitting device, a speed change gear assembly coupled to the output shaft of the hydrodynamic power transmitting device and adapted to obtain a plurality of speed ratios by selectively engaging a plurality of engaging elements, shift control means for attaining a speed ratio appropriate for the running condition of the vehicle by selectively actuating the engaging elements, and engaging force adjusting means for adjusting the engaging force of the clutch, the improvement comprising means for detecting the movement when a shift starts, means for detecting the deviation of the speed ratio from the speed ratio preceding the shift, and control means for supplying a first control signal to said engaging force adjusting means to increase the engaging force of the clutch when said shift starting time detecting means detects the start of the shift and a second control signal to said engaging force adjusting means to decrease the engaging force of the clutch when said deviation detecting means detects the deviation of the speed ratio.

6. A control system as claimed in claim 5, wherein said shift starting time detecting means includes means for detecting a moment when an engaging element, adapted to engage to attain the shift, starts to engage.

7. A control sytem as claimed in claim 6, wherein said engaging element comprises a friction engaging device having a hydraulically operated actuator and said detecting means comprises a position detecting device to detect the position of a piston in said actuator.

8. A control system as claimed in claim 5, wherein said speed change gear assembly includes a rotary element whouse rotational speed changes in the course of a shift, said deviation detecting means includes means to detect the rotational speed of said rotary element in the course of the shift, the deviation detecting means being adapted to detect the deviation of the speed ratio by detecting the deviation of the rotational speed of said rotary element from the rotational speed in the speed ratio preceding the shift.

9. In a control system for a clutch interposed between input and output shafts of hydrodynamic power transmitting device coupled to a prime mover, an engaging force adjustable clutch interposed between input and output shafts of the hydrodynamic power transmitting device so as to function in parallel with said hydrodynamic power transmitting device, a speed change gear assembly coupled to the output shaft of the hydrodynamic power transmitting device and adapted to obtain a plurality of gear ratios by selectively engaging a plurality of engaging elements including a first friction engaging element engaged to obtain a first speed with a relatively large speed ratio and a secod friction engaging element engaged to obtain a second speed with a relatively small speed ratio, shift control means that permits attaining one speed ratio appropriate for the running condition of the vehicle by selectively actuating the engaging elements, and engaging force adjusting means for adjusting the engaging force of the clutch, the improvement comprising means for detecting a moment when the engagement of said second friction engaging element starts in the course of a shift from said first speed to said second speed, and control means for supplying a control signal to said engaging force adjusting means to increase the engaging force of the clutch in the initial stage of the shift when said engagement starting time detecting means detects the start of the engagement of said second friction engaging element.

10. A control system as claimed in claim 9, wherein said second friction engaging element has a hydraulically operated actuator and said engagement starting time detecting means comprises a position detecting device to detect the position of a piston in said actuator.

11. In a control system for a clutch interposed between input and output shafts of hydrodynamic power transmitting device coupled to a prime mover, an engaging force adjustable clutch interposed between input and output shafts of the hydrodynamic power transmitting device so as to function in parallel with said hydrodynamic power transmitting device, a speed change gear assembly coupled to the output shift of the hydrodynamic power transmitting device and adapted to obtain a plurality of gear ratios by selectively engaging a plurality of engaging elements including a first friction engaging element engaged to obtain a first speed with a relatively large speed ratio and a second friction engaging element engaged to obtain a second speed with a relatively small speed ratio, shift control means for attaining one speed ratio appropriate for the running condition of the vehicle by selectively actuating the engaging elements, and engaging force adjusting means for adjusting the engaging force of the clutch, the improvement comprising means for detecting a moment when the engagement of said second friction engaging element starts in the course of a shift from said first speed to said second speed, rotational speed detecting means for detecting the deviation of the rotational speed of said rotary element from the rotational speed in said first speed, and control means for supplying a first control signal to said engaging force adjusting means to increase the engaging force of the clutch when said engagement starting time detecting means detects the start of the engagement of said second friction engaging element and a second control signal to said engaging force adjusting means to decrease the engaging force of the clutch when said rotational speed detecting means detects the deviation of the rotational speed of said rotary element from the rotational speed in said first speed.

12. A control system as claimed in claim 11, wherein said second friction engaging element has a hydraulically operated actuator and said engagement starting time detecting means comprises a position detecting device to detect the position of a piston in said actuator.

* * * * *